(12) United States Patent
Therani

(10) Patent No.: US 7,235,117 B2
(45) Date of Patent: Jun. 26, 2007

(54) POROUS SULPHA SPONGE IRON COMPOUND, A PROCESS FOR PREPARING THE SAME AND A METHOD FOR DESULPHURIZING NATURAL GAS THEREWITH

(75) Inventor: Nadathur Venkata Raghavan Therani, Chennai (IN)

(73) Assignee: Good Earth Chemicals Private Limited, Karnataka (IN)

( * ) Notice: Subject to any disclaimer, the term of this patent is extended or adjusted under 35 U.S.C. 154(b) by 218 days.

(21) Appl. No.: 10/479,715

(22) PCT Filed: Jun. 8, 2001

(86) PCT No.: PCT/IN01/00108

§ 371 (c)(1),
(2), (4) Date: Dec. 5, 2003

(87) PCT Pub. No.: WO02/101100

PCT Pub. Date: Dec. 19, 2002

(65) Prior Publication Data

US 2004/0146584 A1    Jul. 29, 2004

(51) Int. Cl.
*B22F 1/00*    (2006.01)
*C01G 49/02*    (2006.01)

(52) U.S. Cl. ............................. 75/348; 423/632

(58) Field of Classification Search .................. 75/348, 75/252, 255, 361, 370, 10.67; 423/244.06, 423/244
See application file for complete search history.

(56) References Cited

U.S. PATENT DOCUMENTS

| | | | |
|---|---|---|---|
| 1,771,136 A | | 7/1930 | Murphy |
| 3,917,800 A | | 11/1975 | McGauley |
| 3,974,256 A | * | 8/1976 | Wheelock et al. .......... 423/230 |
| 4,008,775 A | * | 2/1977 | Fox .............................. 175/64 |
| 4,061,716 A | | 12/1977 | McGauley |
| 4,115,106 A | * | 9/1978 | Snavely et al. ............... 75/348 |
| 4,478,803 A | | 10/1984 | Zambrano |
| 2001/0009125 A1 | * | 7/2001 | Monereau et al. ............ 95/117 |

OTHER PUBLICATIONS

International Search Report.

* cited by examiner

*Primary Examiner*—Roy King
*Assistant Examiner*—Kathleen McNelis
(74) *Attorney, Agent, or Firm*—Rader, Fishman & Grauer PLLC

(57) ABSTRACT

This invention relates to a novel porous, sulpha sponge iron compound derived from haematite having the following composition given below: and having trace elements such as Au, Pt and Ag therein, by dissolving said haematite in concentrated hydrochloric acid. The acidic solution is treated with alcoholic ammonia and glacial acetic acid. The sulpha sponge iron compound has $Fe^2/Fe^3$ cores forming interstatially stabilized clusters. The invention also includes a process for desulphurising natural gas by adsorbing sulphur containing contaminants in the novel sulpha sponge iron compound either at the drilling site or on a bed containing the same.

6 Claims, No Drawings

POROUS SULPHA SPONGE IRON COMPOUND, A PROCESS FOR PREPARING THE SAME AND A METHOD FOR DESULPHURIZING NATURAL GAS THEREWITH

This invention relates to a novel porous sponge iron compound, a process for preparing the same and a method for desulphurising natural gas therewith.

BACKGROUND ART

Natural gas which is a mixture of low molecular weight hydrocarbons and small amounts of higher hydrocarbons is contaminated with sulphur and nitrogen compounds as well as with oxides of carbon. Sulphur contaminants are hydrogen sulphide, carbonyl sulphide and mercaptans.

Process gas and fuel are produced by desulphurising sulphur containing natural gas streams. Harmful sulphur contaminants are removed by direct reduction of iron ore.

Conventional desulphurization methods include adsorption of the contaminants by metallic compounds, ceramic and metal oxides pellets, finely divided iron, and porous iron oxide. Direct reduction of iron ore also results in spongy iron having sulphur contaminant absorbing capability.

Molecular sieves and compounds such as Zinc oxide are generally used as decontaminants for hydrocarbon fuel gas. Cracking of components are to be avoided during such desulphurisation step.

Porous sponge iron derived from magnetite has also been used as a desulphurizing agent. Though found effective in many desulphurisation reactions, this spongy iron does not have very high adsorptive capacity.

An object of this invention is to develop a highly adsorbant porous sulpha sponge iron compound whose adsorbent capacity may be renewed or controlled to the desired level by repeated processing.

Yet another object of this invention is for a method of desulphurising natural gas by adsorbing sulphur containing contaminants in the above porous sulpha sponge iron compound. Desulphurization process according to this invention results in substantially freeing natural gas from such contaminants. Since this process is not carried out at high temperatures, cracking of natural gas is also avoided.

DISCLOSURE OF THE INVENTION

Porous sulpha sponge iron compound of this invention is derived from haematite having the following composition:

| | |
|---|---|
| $SiO_2$ | 3.28% |
| $Al_2O_3$ | 3.74% |
| $Fe_2O_3$ | 92.40% |
| CaO | 0.42% |
| MgO | 0.19% |
| $P_2O_5$ | 0.08% |
| $K_2O$ | 0.06% |
| $Na_2O$ | nil |
| $SO_3$ | 0.04% |
| Cl | 0.0001% |
| $Mn_2O_3$ | 0.14% |

Naturally occuring haematite is magnetically separated and the separated part is dissolved in concentrated hydrochloric acid. The acidic solution is filtered and concentrated. Acid chloride solution of the haematite thus obtained is reacted with concentrated ammonium hydroxide in an alcoholic medium. The precipitated compound is found to have a high potential to react with hydrogen sulphide. This product is deposited on a base of haematite and powdered to 300 mesh size and is now ready for use in scavenging in situ hydrogen sulphide during oil well drilling. This sulpha sponge shows an adsorbent capacity exceeding 2500 ppm.

In a specific embodiment, the base haematite of 500 gm is powdered to about 300 mesh and is moistened with absolute alcohol. 30 ml of the acid solution obtained by dissolving magnetically separated haematite in concentrated hydrochloric acid is added to this with thorough mixing to obtain a mixture of flowing consistency. Ammonium hydroxide is added to this mixture in different stages under continuous stirring. Addition of ammonium hydroxide is stopped when the mass thickens and appears to have a semisolid consistency and the mass is then neutralized by the addition of a few drops of glacial acetic acid. The resultant mass is dried preferably under infra red rays, crushed and passed through 300 mesh sieve.

Testing of the substance produced above is carried out with liberated hydrogen sulphide obtained from solution of sodium sulphide or with an aqueous saturated solution of hydrogen sulphide. In case the performance is below the desired level of 2500 ppm of $H_2S$ with 1 gm of the porous sulpha sponge, the step of redeposition with the acid chloride solution of haematite is repeated till the desired adsorbancy level is achieved. This product can effectively be used to scavenge hydrogen sulphide produced in situ during oil well drilling.

Sour natural gas containing sulphur contaminants are desulphurated by passing the same through a bed containing porous sulpha sponge iron compound as specified above. The reaction may be carried out at known desulphurising temperature in the range of 200 to 400° C. The porous sulpha sponge iron compound adsorbs the contaminants and the effluent gas is substantially free of hydrogen sulphide. The improved capacity for adsorbing sulphur containing compounds by the sulpha sponge from natural gas makes the desulphurisation process highly effective. Careful control of the reaction temperature depending upon the constituents of the natural gas will help in avoiding cracking. This sulpha sponge iron compound of our invention may be used for hydrogen sulphide scavenging in any field including sewage treatment and the like environmental application.

Thus, this invention relates to a novel porous, sulpha sponge iron compound derived from haematite having the following composition:

| | |
|---|---|
| $SiO_2$ | 3.28% |
| $Al_2O_3$ | 3.74% |
| $Fe_2O_3$ | 92.40% |
| CaO | 0.42% |
| MgO | 0.19% |
| $P_2O_5$ | 0.08% |
| $Na_2O$ | 0.00% |
| $SO_3$ | 0.04% |
| Cl | 0.0001% |
| $Mn_2O_3$ | 0.14% | and having trace elements such as Au, Pt and Ag therein, by dissolving said haematite in concentrated hydrochloric acid, and treating said acidic solution with alcoholic ammonia and glacial acetic acid to obtain said sulpha sponge iron compound, having a plurality of $Fe^2/Fe^3$ cores forming interstatially stabilized clusters.

This invention also relates to a process for producing porous sulpha sponge iron compound from haematite by magnetically separating haematite, dissolving the same in hydrochloric acid, concentrating and treating the said acidic solution with ammonium hydroxide in an alcoholic medium, depositing the precipitate obtained on haematite drying and powdering the same.

An alternate route for making the porous sulpha sponge is by adding a hydrochloric acid solution of magnetically separated haematite to naturally occuring haematite base, ammoniating the same in an alcoholic medium till a semisolid is formed, neutralising the same under an acid and subsequently drying and powdering.

Method of desulphurization may be effected at the drilling site by adding the novel sulpha sponge iron compound or afterwards by allowing the gas to pass over a bed of the above referenced porous sulpha sponge iron compound.

This invention therefore includes a method for desulphurising natural gas comprising the steps contacting the natural gas with the porous sulphur sponge iron.

The invention claimed is:

1. A process for producing a porous sulpha sponge iron compound having a plurality of $Fe^2/Fe^3$ cores forming interstatially stabilized clusters which comprises the steps of magnetically separating haematite having the following composition:

| | |
|---|---|
| $SiO_2$ | 3.28% |
| $Al_2O_3$ | 3.74% |
| $Fe_2O_3$ | 92.40% |
| CaO | 0.42% |
| MgO | 0.19% |
| $P_2O_5$ | 0.08% |
| $Na_2O$ | 0.00% |
| $SO_3$ | 0.04% |
| Cl | 0.0001% |
| $Mn_2O_3$ | 0.14% | and having trace elements such as Au, Pt and Ag therein,
dissolving the separated haematite in hydrochloric acid to form an acidic solution,
concentrating and treating said acidic solution with ammonium hydroxide to form a precipitate,
depositing the precipitate on haematite, and
drying and powdering the haematite with deposited precipitate to obtain the porous sulpha sponge iron compound.

2. The process as claimed in claim 1, wherein ammonium hydroxide is added to the acidic solution in an alcoholic medium.

3. The process as claimed in claim 1 wherein the precipitate is separated when a semisolid mass is formed and then deposited on haematite and powdered to 300 mesh.

4. The process as claimed in 2 wherein the precipitate is separated when a semisolid mass is formed and then deposited on haematite and powdered to 300 mesh.

5. A process for preparing a porous sulpha sponge iron compound having a plurality of $Fe^2/Fe^3$ cores forming interstatially stabilized clusters, which comprises the steps of adding an acidic solution of magnetically separated haematite having the following composition:

| | |
|---|---|
| $SiO_2$ | 3.28 % |
| $Al_2O_3$ | 3.74 % |
| $Fe_2O_3$ | 92.40 % |
| CaO | 0.42 % |
| MgO | 0.19 % |
| $P_2O_5$ | 0.08 % |
| $Na_2O$ | 0.00 % |
| $SO_3$ | 0.04 % |
| Cl | 0.0001 % |
| $Mn_2O_3$ | 0.14 %, and | having trace elements such as Au, Pt and Ag therein, to a haematite base to obtain a reaction mixture,
ammoniating the reaction mixture until a semisolid mass is formed,
neutralizing the semisolid mass with an acid, and
subsequently drying and powdering the neutralized mass to obtain the porous sulpha sponge iron compound.

6. The process as claimed in claim 5, wherein said ammoniating step is carried out in an alcoholic medium, said neutralization is effected by adding acetic acid to said semisolid mass, said drying is effected under infra red rays and the mass then powdered to 300 mesh.

* * * * *